United States Patent [19]
Kubota

[11] Patent Number: 5,506,902
[45] Date of Patent: Apr. 9, 1996

[54] DATA BROADCASTING SYSTEM

[75] Inventor: Ichiro Kubota, Kanagawa, Japan

[73] Assignee: Sony Corporation, Tokyo, Japan

[21] Appl. No.: 228,421

[22] Filed: Apr. 15, 1994

[30] Foreign Application Priority Data

Apr. 20, 1993 [JP] Japan .................................. 5-116480

[51] Int. Cl.$^6$ ........................................ H04L 9/00
[52] U.S. Cl. ................................. 380/9; 380/20
[58] Field of Search ............................ 380/9, 20

[56] References Cited

U.S. PATENT DOCUMENTS

| | | | |
|---|---|---|---|
| 4,323,921 | 4/1982 | Guillou | 380/20 |
| 4,337,483 | 6/1982 | Guillou | 380/20 |
| 5,070,404 | 12/1991 | Bullock et al. | |
| 5,247,575 | 9/1993 | Sprague et al. | 380/9 |

FOREIGN PATENT DOCUMENTS 492486  7/1992  WIPO.
508394  10/1992  WIPO.

OTHER PUBLICATIONS

Numaguchi "Broadcasting of Still Images" by NHK Laboratory Note No. 187, Toky, Japan, pp. 1–17.

Bettac, et al. (1990) "Verteilung Ami/Cpfsk–Modulierter Daten Uber Einen Analogen Satelliten–Standard–TV–Kanal" *Nachrichtentechnik Elektronik* vol. 40, No. 4 pp. 122–127.

Edwardson "A Conditional Access System for Direct Broadcasting by Satellite", Journal of the Institution of Electronic and Radio Engineers vol. 55, No. 11, Nov. 1985, pp. 377–385.

*Primary Examiner*—Salvatore Cangialosi
*Attorney, Agent, or Firm*—Jay H. Maioli

[57] ABSTRACT

A data broadcasting system for the low-cost delivery of character-heavy data such as newspapers and magazines. Newspaper or other data are transmitted from a newspaper publisher or service to an artificial satellite via a broadcasting center to be relayed to a subscriber. The subscriber receives the data by means of a receiver via an outdoor apparatus. The received data are sent to a recorder to be recorded on a recording medium such as a compact magneto-optical disc for later display.

14 Claims, 15 Drawing Sheets

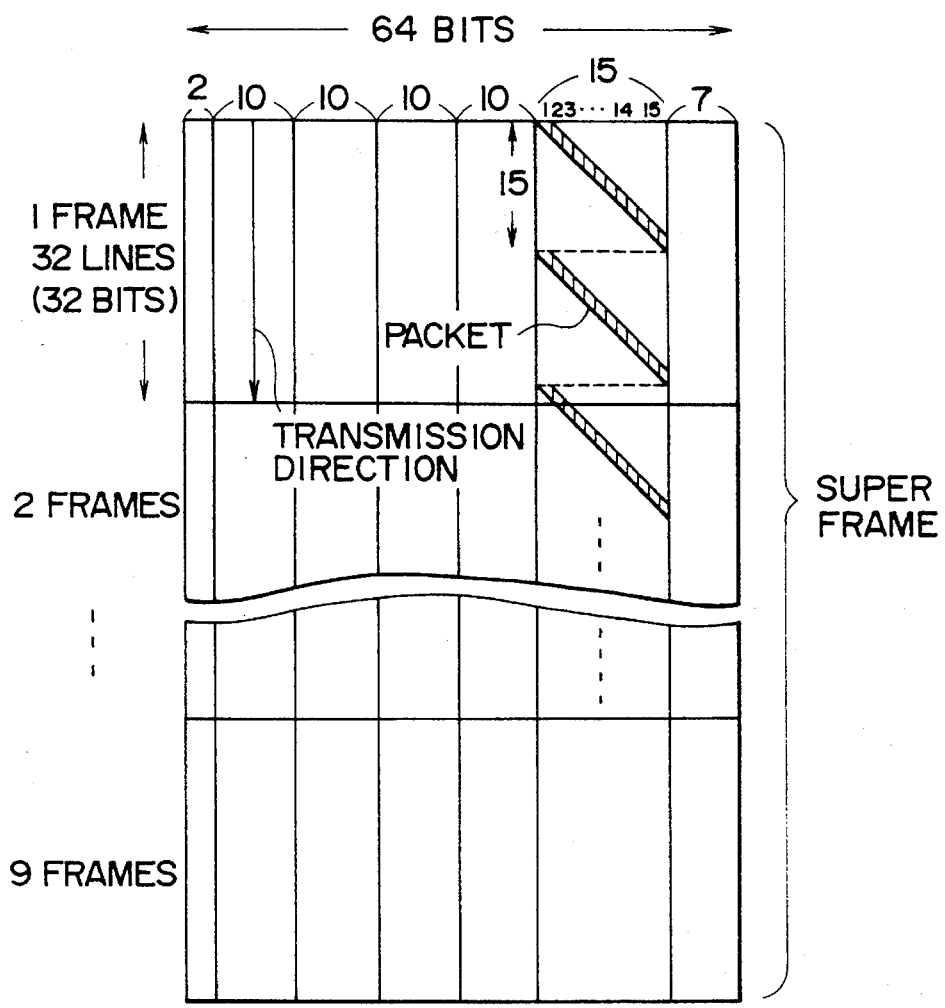

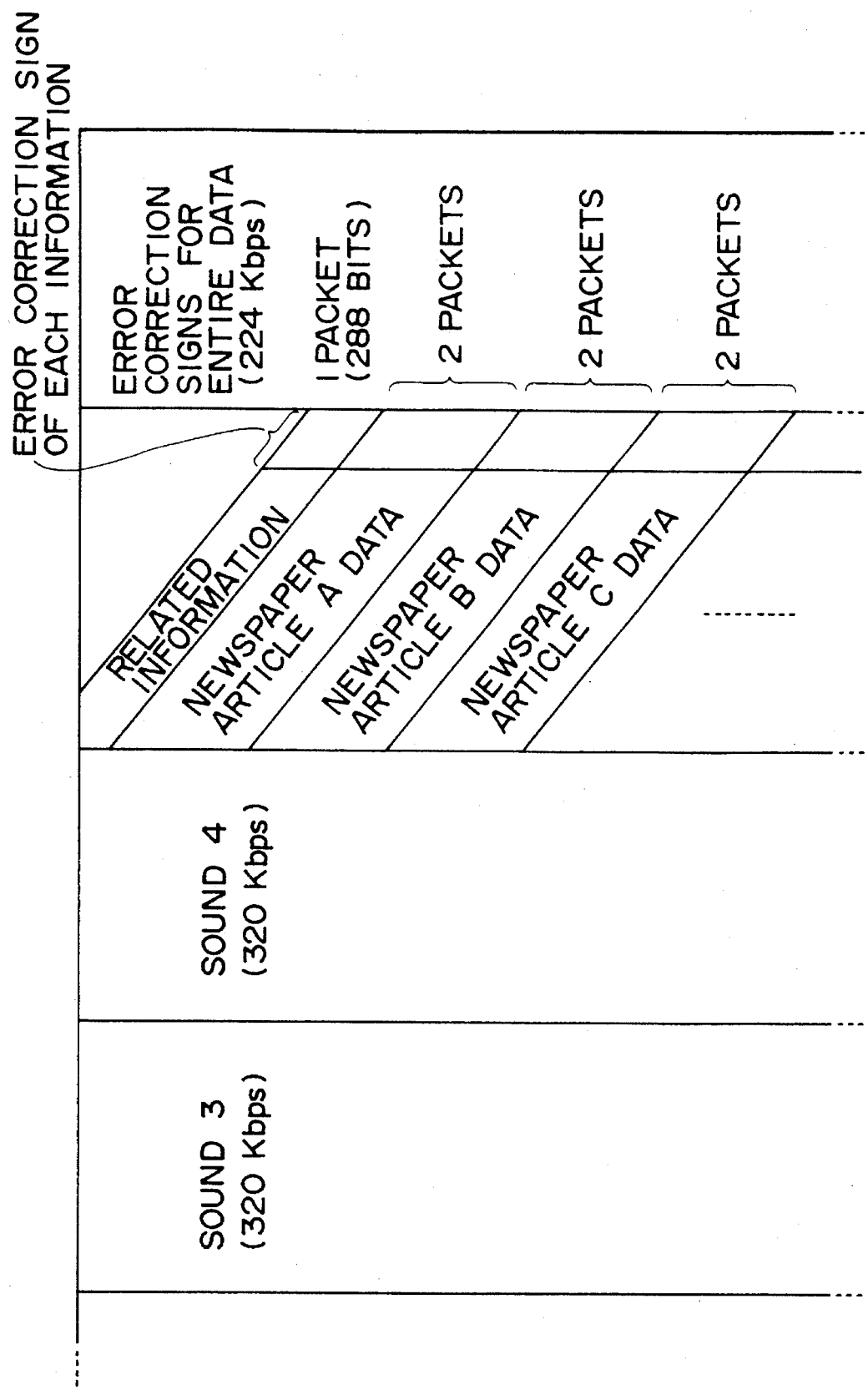

FIG. 10

| # | | | |
|---|---|---|---|
| 1 | RELATED INFORMATION | RELATED INFORMATION | RELATED INFORMATION |
| 2 | NEWSPAPER DATA A | NEWSPAPER DATA A | NEWSPAPER DATA A |
| 3 | NEWSPAPER DATA B | NEWSPAPER DATA B | NEWSPAPER DATA B |
| 4 | NEWSPAPER DATA C | NEWSPAPER DATA C | NEWSPAPER DATA C |
| ... | | | |
| 15 | NEWSPAPER DATA I | NEWSPAPER DATA I | NEWSPAPER DATA I |

(Row 1 labeled as PACKET)

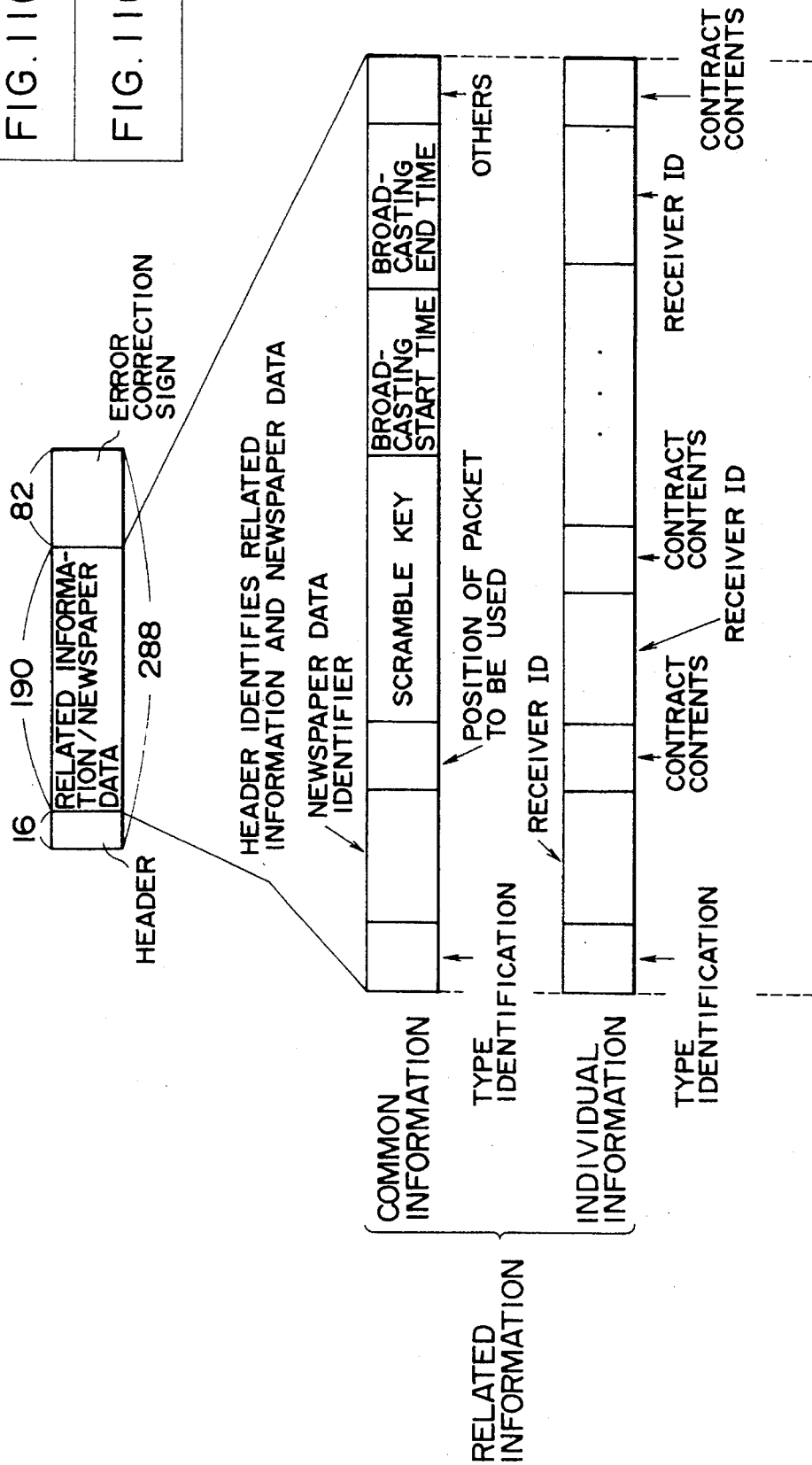

| FIG. 11(a) |
|---|
| FIG. 11(b) |

ONLY HEADLINES ARE DISPLAYED. CLICKING A HEADLINE DISPLAYS AN ARTICLE UNDER IT.

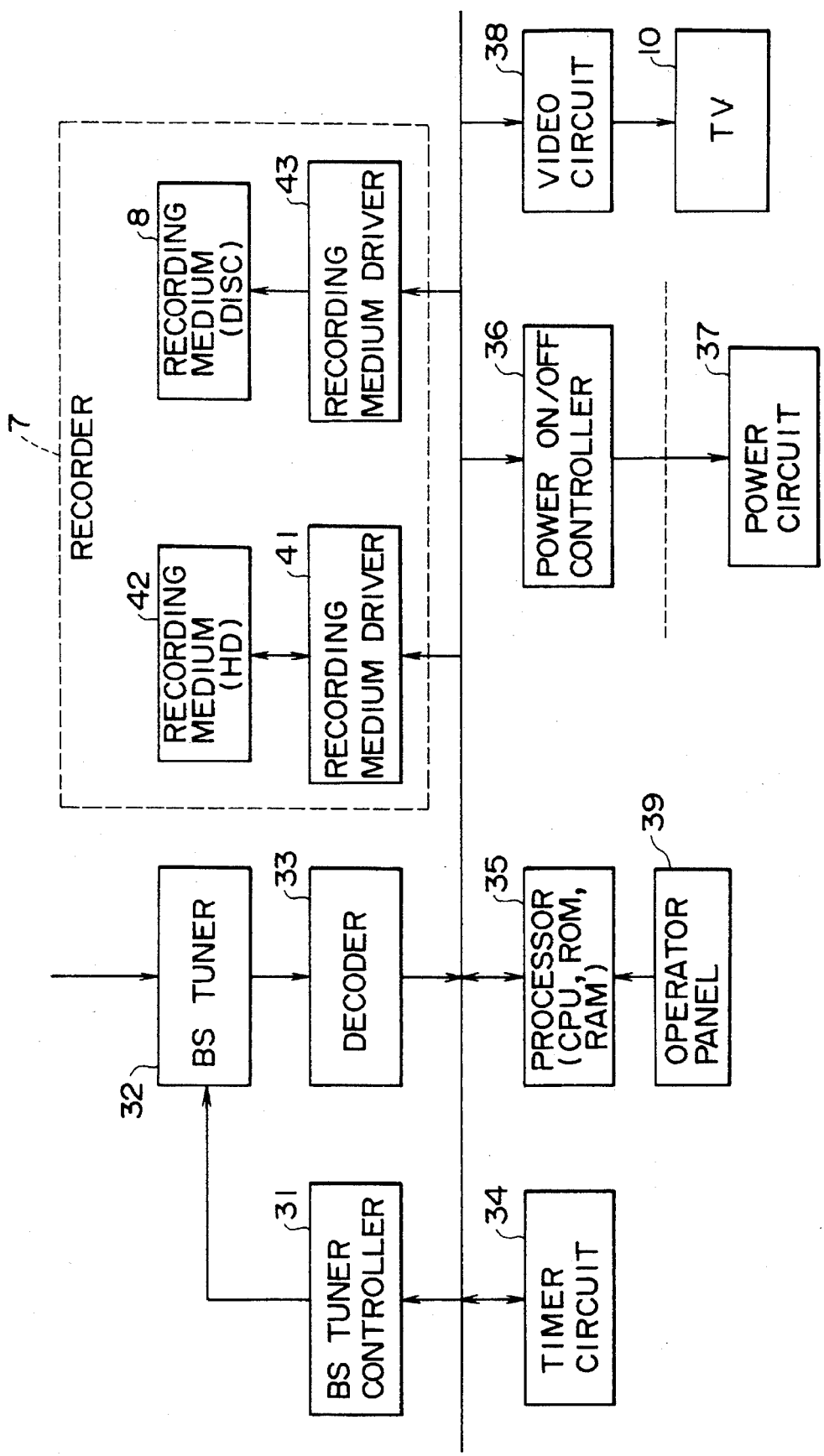

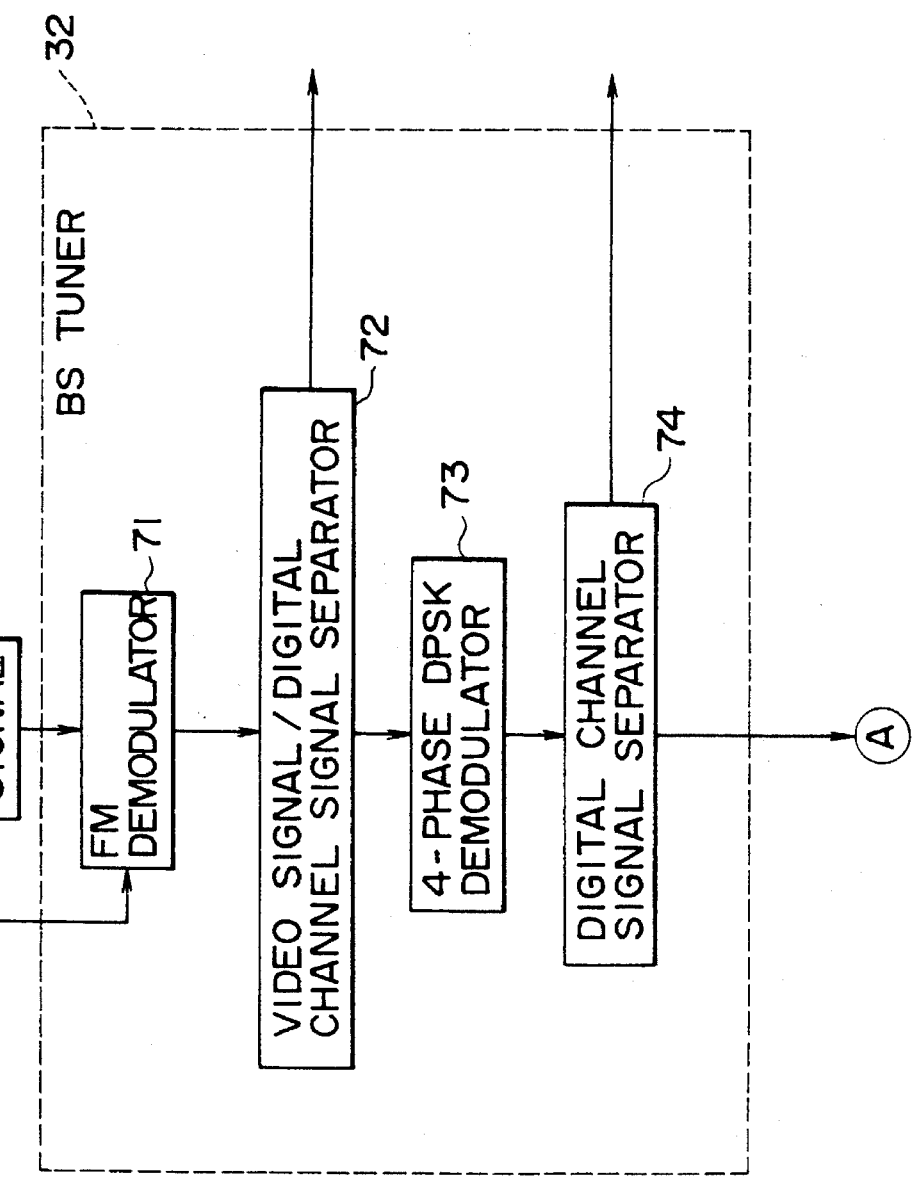

DATA BROADCASTING SYSTEM

BACKGROUND OF THE INVENTION

1. Field of the Invention

The present invention relates to a data broadcasting system suitable for electronically distributing, via an artificial satellite, such information mainly composed of text (or characters) as newspapers, magazines, and books that are conventionally distributed directly to readers or sold in stores on a daily or otherwise regular basis.

2. Description of the Related Art

Conventionally, newspapers, magazines, and books are distributed in hardcopy in most cases. However, recent advancement in data communications technologies is making it possible to distribute information hitherto conveyed in printed matter such as those mentioned above through electronic means. For example, on-line network services are widely available in which a database containing information such as that obtained from newspapers and the like can be accessed by personal computers via a public telephone network for information retrieval.

In addition, there already exists a service for distributing desired newspaper or magazine articles to contracted subscribers by means of facsimile.

However, the distribution of information in hardcopy presents following problems for example:

(1) As long as one reads only one copy of newspaper or magazine on a regular basis, there may be little problem in handling the copy; however, as the number of copies increases, they become too bulky to handle conveniently;

(2) If a family or an office subscribes to only one copy of newspaper for example, only one family or office member can read the copy at a time;

(3) Consumption of a huge volume of paper caused by hardcopy distribution is presenting environmental problems associated with deforestation;

(4) Transportation and delivery of hardcopy requires a lot of manpower, thereby increasing transportation cost; and (5) Transportation and delivery of hardcopy require a lot of vehicles driven by internal combustion engines, thereby presenting an air-pollution problem.

Conventionally, however, the information delivery by electronic means is too costly for the general public to use conveniently because of a relatively high fee for using the database service plus a telephone charge for accessing it.

OBJECTS AND SUMMARY OF THE INVENTION

It is an object of the present invention to provide a data broadcasting method for delivering information at a lower cost than that of the conventional counterpart.

According to one aspect of the present invention there is provided a data broadcasting method for transmitting predetermined data via a broadcasting channel, comprising the steps of:

inserting coded data such as a newspaper, a magazine, or a book into a predetermined artificial satellite channel;

transmitting the coded data via an artificial satellite;

receiving the transmitted data from the artificial satellite; and decoding the received data to reproduce the newspaper, magazine or book.

According to another aspect of the present invention there is provided a data broadcasting system for transmitting predetermined data via a broadcasting channel, comprising:

multiplexing means for multiplexing data such as a newspaper, a magazine, or a book with a broadcast signal to generate a multiplexed signal;

transmitting means for transmitting the multiplexed signal to a predetermined artificial satellite channel;

receiving means for receiving the multiplexed signal via the predetermined artificial satellite channel;

separating means for separating the data from the multiplexed signal received by the receiving means; and decoding means for decoding the separated data by the separating means.

According to further aspect of the present invention there is provided a data broadcasting apparatus for transmitting predetermined data via a broadcasting channel, comprising:

multiplexing means for multiplexing a video signal, a audio signal, and data such as a newspaper, a magazine, or a book to generate a multiplexed signal; and transmitting means for transmitting the multiplexed signal to a predetermined artificial satellite channel.

According to still further aspect of the present invention there is provided a broadcast receiving apparatus for receiving a broadcast signal transmitted via a broadcasting channel, comprising:

receiving means for receiving the broadcast signal transmitted via an artificial satellite channel;

separating means for separating data such as a newspaper, a magazine, or a book from the received broadcast signal; and decoding means for decoding the separated data.

Specifically, in a data broadcasting method, data such as newspapers, magazines, or books are inserted in a predetermined channel of an artificial satellite, the inserted data are transmitted via the satellite, the transmitted data are received by a data receiver provided in each subscribing household or office for example, and the received data are recorded onto a recording medium such as a hard disk or a compact magneto-optical disc.

For the above-mentioned channel, a channel for digital data transmission of a broadcasting satellite or a communications satellite can be used. The above-mentioned data to be transmitted and received can contain article data and retrieval data for retrieving the article data. These retrieval data and article data can be scrambled.

In the data transfer system having the above-mentioned construction, newspaper and magazine data are transmitted via an artificial satellite and received by a data receiver to be recorded onto a recording medium, thereby eliminating the need for delivery by human workers and therefore reducing delivery cost. In addition, the data receiving party need not access the data sending party, thereby reducing an operator load on the data receiving party side.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 7 is a diagram illustrating a function of a header of FIG. 6;

FIG. 8 is a diagram illustrating oblique multiplexing in the independent data channel;

FIG. 9 is a diagram illustrating data recorded on a packet of the independent data channel of FIG. 8;

FIG. 10 is a diagram illustrating positions of packets constituting the independent data channel;

FIG. 14 is a block diagram illustrating a data receiver of FIG. 1 practiced as a preferred embodiment of the invention.

DESCRIPTION OF THE PREFERRED EMBODIMENTS

This invention will be described in further detail by way of example with reference to the accompanying drawings.

Figure 1:
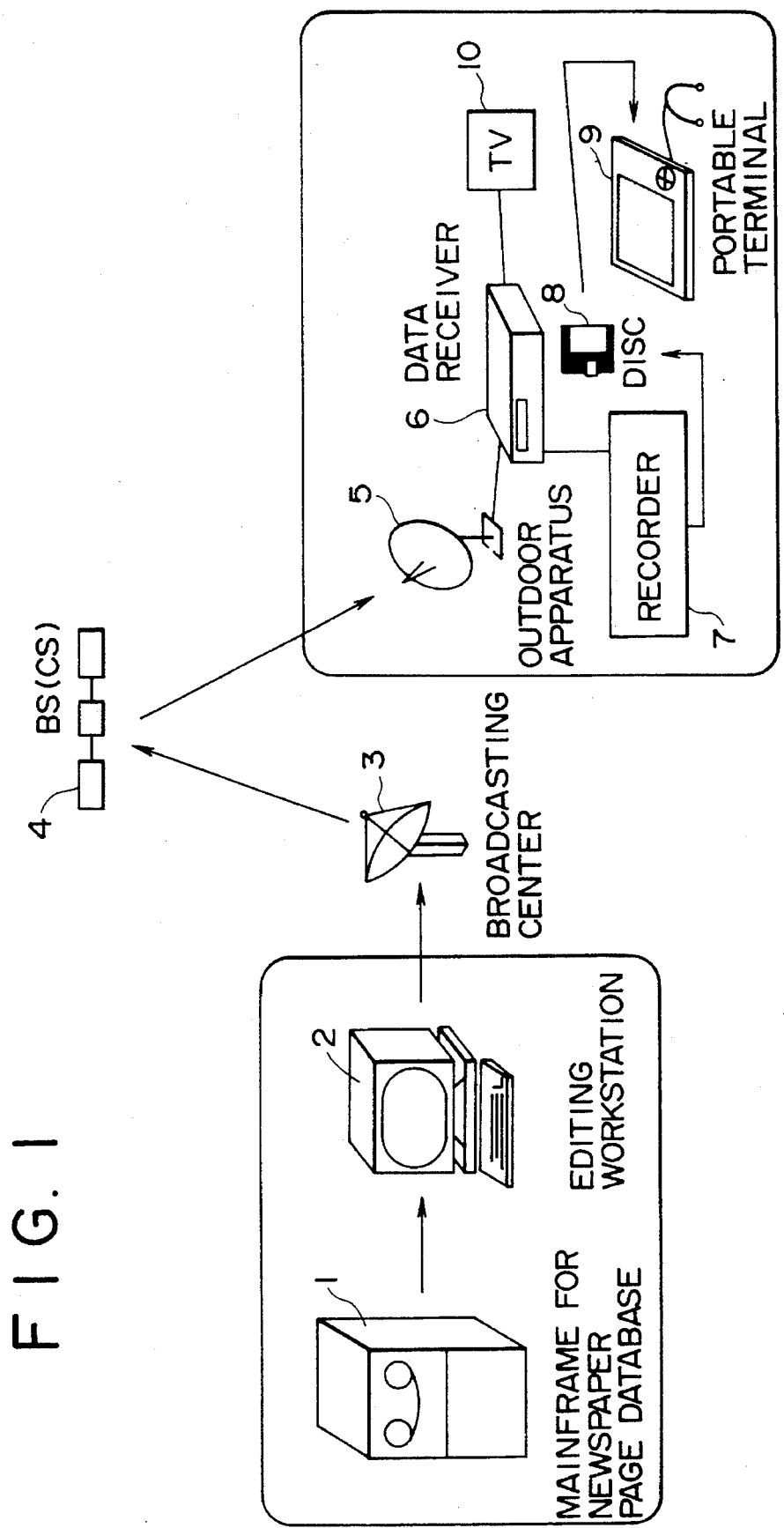
FIG. 1 is a diagram illustrating the data broadcasting system practiced as one preferred embodiment of the present invention.

Now, referring to FIG. 1, there is shown the data broadcasting system practiced as one preferred embodiment of the present invention. A newspaper publisher as an information sending party has a mainframe 1. The mainframe 1 holds a newspaper page database. The newspaper page database contains article information to be printed and layout information. The data held in this database are transmitted as required to an editing workstation 2 to be edited.

To be more specific, the article data are edited by the editing workstation 2 on an article type basis into a form in which the data can be most easily retrieved by the receiving party. For example, this editing facility creates a screen for retrieval in which a page is reduced with its layout unchanged and only headlines displayed. Further, the retrieval screen (headlines) listing is related to the articles whose headlines are displayed so that selecting one of the headline displays the corresponding article. The data thus edited into a form in which the receiving party can retrieve the data easily are transmitted to a broadcasting center 3 via a ground data circuit.

Figure 2:
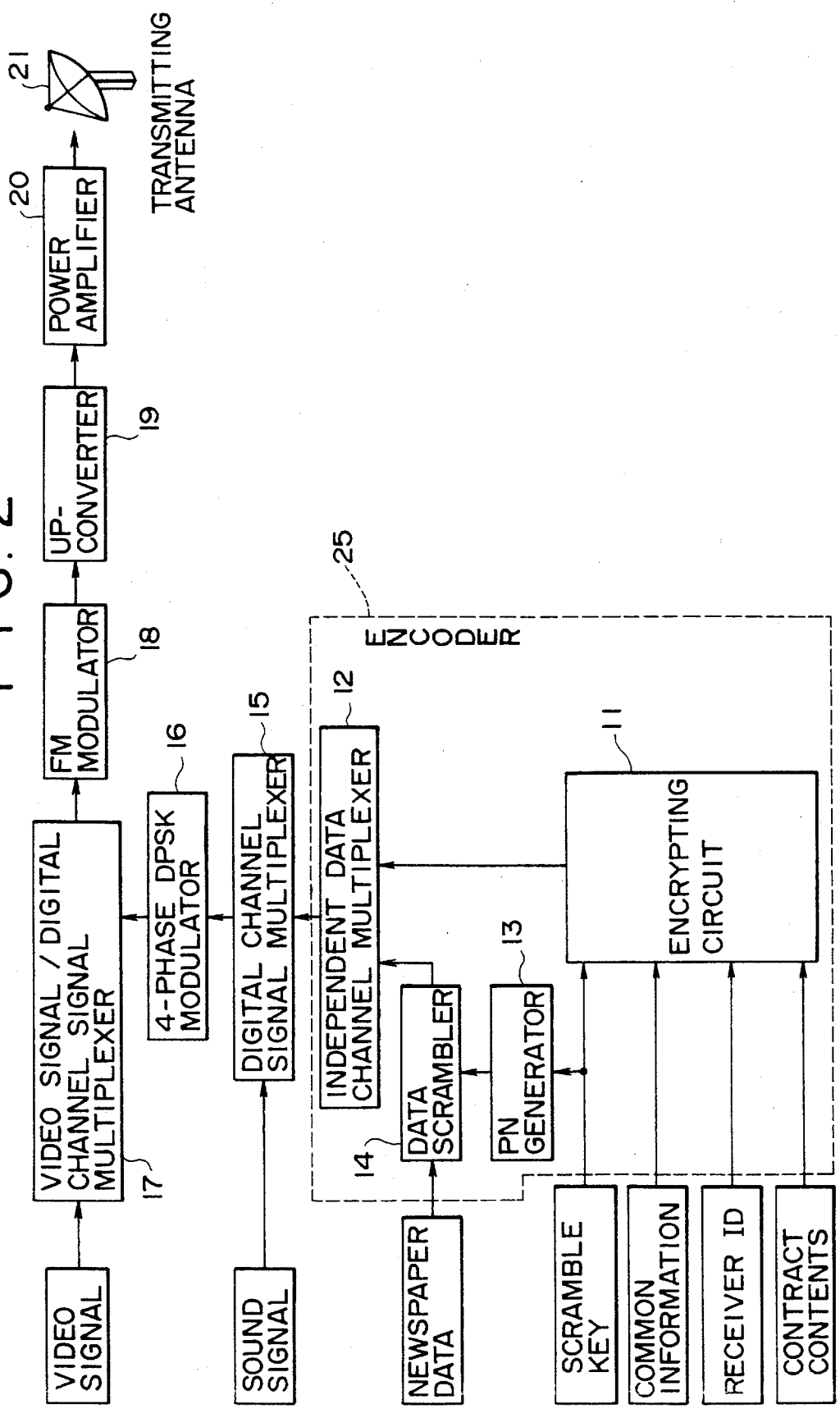
FIG. 2 is a block diagram illustrating a construction of a broadcasting center of the embodiment of FIG. 1.

The broadcasting center 3 has a transmitting apparatus as shown in FIG. 2, for example. That is, data coming from the newspaper publisher are composed of newspaper data, a scramble key, common information, a receiver ID, and subscription terms, for example. Of these pieces of data, the newspaper data are fed to a data scrambler 14 to be scrambled according to a pseudo random series generated by a PN (Pseudo Noise) generator 13. The scrambled data are sent to an independent data channel multiplexer 12. The pseudo random series generated by the PN generator is set according to the scramble key provided by the newspaper publisher.

In addition to the above-mentioned scramble key, the common information, the receiver ID, and the subscription terms are supplied to an encrypting circuit 11 to be encrypted. The encrypted data are supplied to the independent data channel multiplexer 12 as related information.

The independent data channel multiplexer 12 multiplexes the scrambled newspaper data coming from the data scrambler 14 with the related information coming from the encrypting circuit 11 to send the result to a digital channel signal multiplexer 15.

The above-mentioned arrangement makes up an encoder 25 for generating data in an independent data channel to be described with reference to FIG. 4.

A audio signal (at least a part of which is an audio signal accompanying a Video signal to be described) is also put in the digital channel signal multiplexer 15, the audio signal being transmitted as a digital channel signal to be described with reference to FIG. 3. The digital channel signal multiplexer 15 multiplexes the entered audio signal (digital audio signal) with data coming from the encoder 25 to send the result to a 4-phase DPSK (Differential Phase-Shift Keying) modulator 16.

The 4-phase DPSK modulator 16 performs 4-phase DPSK modulation on the entered data and outputs the result to a video signal/digital channel signal multiplexer 17. A video signal to be broadcast by the broadcasting center 3 is also entered in the video signal/digital channel signal multiplexer 17. While the audio signal entered in the digital channel signal multiplexer 15 is digital, the video signal entered in the video signal/digital channel signal multiplexer 17 is analog.

The video signal/digital channel signal multiplexer 17 frequency-multiplexes the entered video signal with the signal coming from the 4-phase DPSK modulator 16 and sends the result to an FM modulator 18. The FM modulator 18 FM-modulates a predetermined carrier by the entered signal and sends the result to an up-converter 19. The up-converter 19 frequency-converts a frequency of the entered FM signal to a frequency on an order of GHz. The resultant FM signal is power-amplified by a power amplifier 20 and the amplified signal is sent to a transmitting antenna 21 to be transmitted to an artificial satellite (broadcasting satellite or communications satellite).

Figure 3:
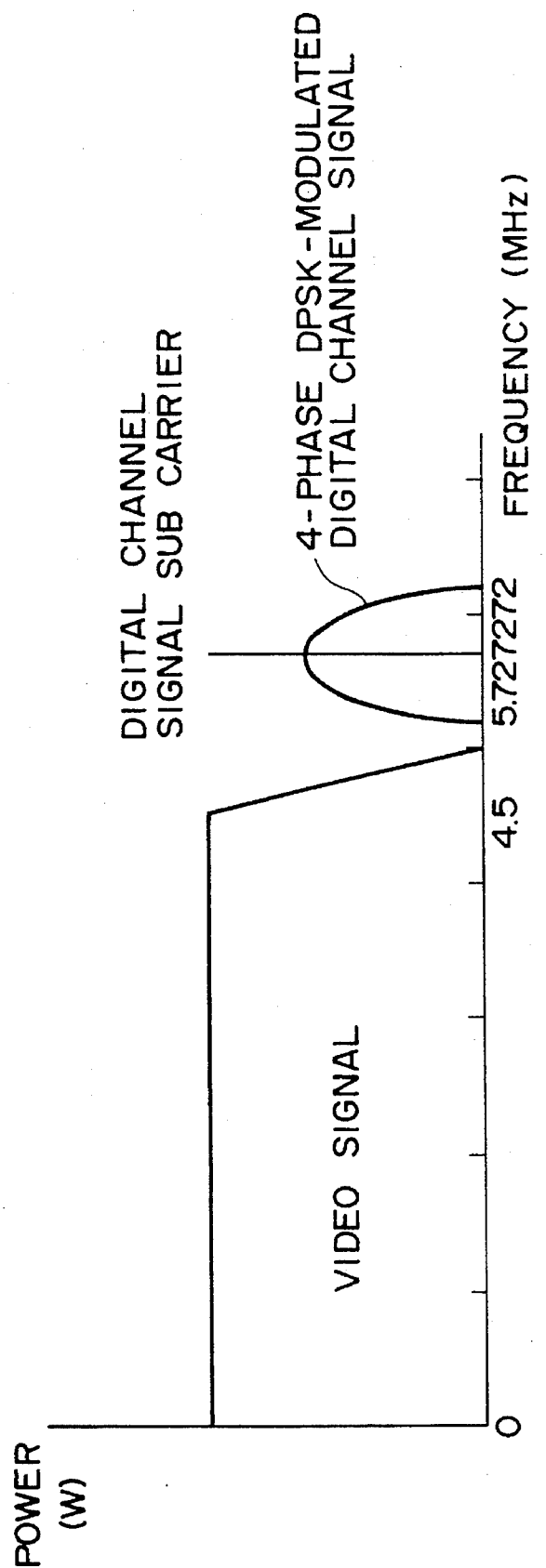
FIG. 3 is a diagram illustrating spectra of data to be entered in an FM modulator of FIG. 2.

Referring to FIG. 3, there is shown frequency spectra of the signal entered in the FM modulator 18. As shown in the figure, the video signal has a frequency band up to about 4.5 MHz. The signal coming from the 4-phase DPSK modulator 16 is a signal with a frequency of 5.727272 MHz being a subcarrier. That is, the video signal and the 4-phase DPSK signal are multiplexed for transmission.

Figure 4:
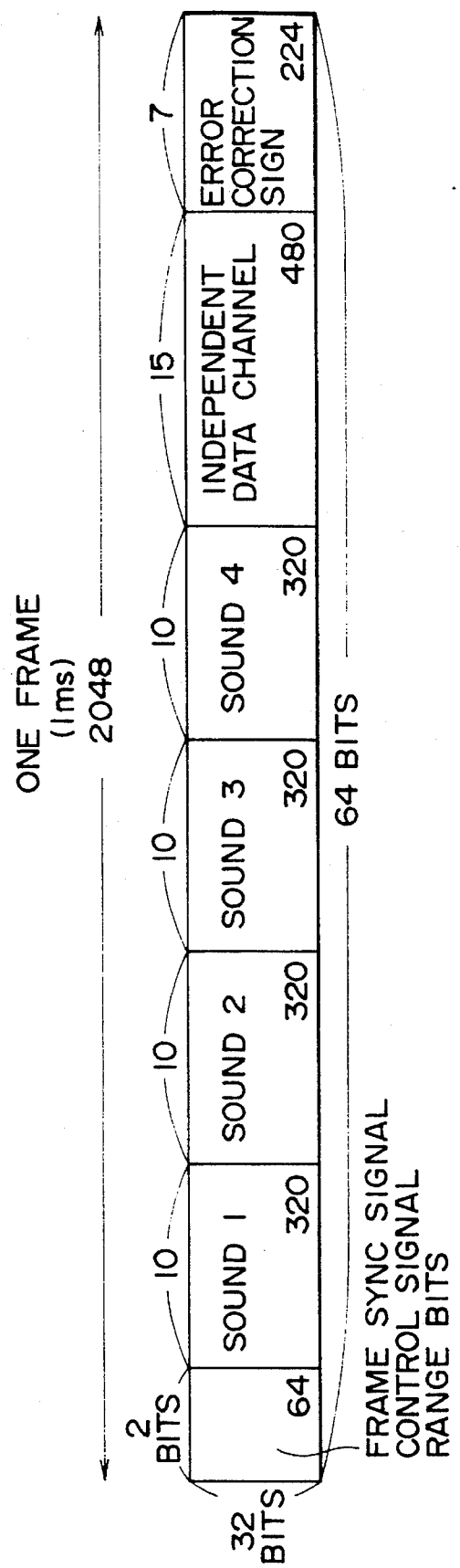
FIG. 4 is a diagram illustrating a format of digital channel data in a digital channel signal multiplexer of FIG. 2.

Referring to FIG. 4, there is shown a format (in mode A) of the 4-phase DPSK modulated digital channel data. As shown in the figure, one frame is made up of data consisting of 64 horizontal bits times 32 vertical bits, amounting to a total of 2048 bits. A range of first 2 bits times 32 bits is for recording a frame sync signal, a control signal, and a range bit.

Since one frame of data is transmitted in one ms, a transmission rate becomes 2,048 Mbps.

The frame sync signal provides synchronization between frames. The control signal consists of 16 bits. As shown in Table 1, bit 1 indicates mode A or mode B. The mode B will be described later. Bits 2 and 3 indicate whether the television audio signal (the signal accompanying the video signal) is a stereo signal or a monaural one-channel signal or a monaural two-channel signal.

Bits 4 and 5 indicate whether a signal to be added besides the television audio signal is a stereo signal, a monaural one-channel signal or a monaural two-channel signal or a signal other than a audio signal. Bits 6 through 15 are extension bits reserved for future use. Bit 16 is a code for indicating whether a sound output is to be suppressed.

TABLE 1

| CONTROL CODE BIT NO. | ① MODE | ②③ TV SOUND | ④⑤ ADDITIONAL SOUND | ⑥...⑮ | ⑯ |
|---|---|---|---|---|---|
| CONTENTS OF CONTROL | A/B | •STEREO<br>•MONAURAL ONLY 1 CHANNEL TRANSMITTED<br>•MONORAL 2 CHANNELS TRANSMITTED | •STEREO<br>•MONAURAL ONLY 1 CHANNEL TRANSMITTED<br>•MONORAL 2 CHANNELS TRANS-MITTED<br>•SIGNALS OTHER THAN SOUND TRANSMITTED | EXTENSION BITS | SOUND OUTPUT SUPPRESSION |

NOTE:
IF CONTROL CODE BIT 1 IS "1", BITS 4 AND 5 ARE HANDLED AS EXTENSION BITS.

Table 2 lists details of bits 1 through 5 and bit 16 shown in Table 1. That is, when bit 1 is "0" it indicates mode A; when bit 1 is "1" it indicates mode B When bit 2 is "0" and bit 3 is "0" it indicates that the television audio signal is stereo; when bit 2 is "0" and bit 3 is "1" it indicates that the television audio signal is the monaural two-channel signal (to be recorded to sound 1 and sound 2 in the format of FIG. 4); and when bit 2 is "1" and bit 3 is "0" it indicates that the television audio signal is the monaural one-channel signal (to be recorded to sound 1 in the format of FIG. 4). When bit 2 and bit 3 are both "1" it specifies nothing in particular.

When bit 4 is "0" and bit 5 is "0" it indicates that the additional sound is stereo; when bit 4 is "0" and bit 5 is "1" it indicates that the additional sound is the monaural two-channel signal (to be recorded to sound 3 and sound 4 in the frame of FIG. 4); and when bit 4 is "1" and bit 5 is "0" it indicates that the additional sound is the monaural one-channel signal (to be recorded to sound 3 of in the format of FIG. 4). When bit 4 and bit 5 are both "1" it indicates that a signal to be transmitted is a non-audio signal.

Further, bit 16 is set to "1" when the sound output is suppressed; it is set to "0" when the suppression is cleared.

TABLE 2

| CONTROL CODE BIT NO. | | CONTROL CODE BIT ASSIGNMENT | |
|---|---|---|---|
| ① | | MODE A:0, B:1 | |
| | | TV SOUND OPERATING MODE | |
| | | | ② |
| | ③ | 0 | 1 |
| ② ③ | 0 | STEREO | MONAURAL ONLY 1 CHANNEL* TRANSMITTED |
| | 1 | MONAURAL 2 CHANNELS** TRANSMITTED | NOT SPECIFIED |

*SOUND 1 USED.
**SOUND 1 AND 2 USED.

TABLE 2-continued

| CONTROL CODE BIT NO. | | CONTROL CODE BIT ASSIGNMENT | |
|---|---|---|---|
| | | ADDITIONAL SOUND OPERATING MODE (MODE A) | |
| | | | ④ |
| | ⑤ | 0 | 1 |
| ④ ⑤ | 0 | STEREO | MONAURAL ONLY 1 CHANNEL TRANSMITTED |
| | 1 | MONAURAL 2 CHANNELS** TRANSMITTED | SIGNALS OTHER THAN SOUND TRANSMITTED |

*SOUND 3 USED.
**SOUND 3 AND 4 USED.

| ⑯ | IF "1", SOUND OUTPUT IS SUPPRESSED; IF "0", SUPPRESSION IS CLEARED. |
|---|---|

Figure 5:
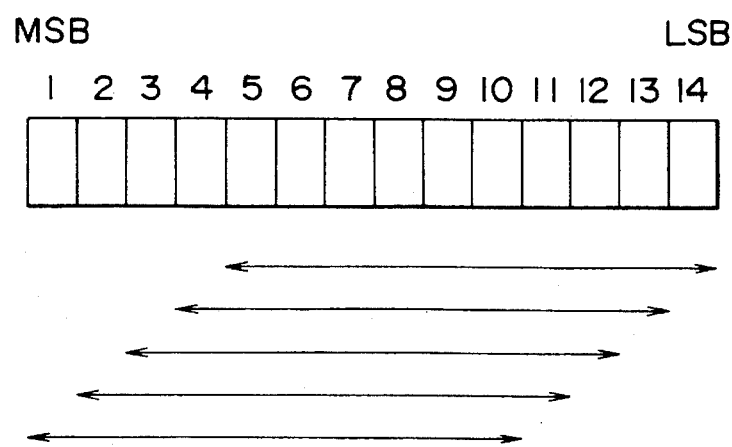
FIG. 5 is a diagram illustrating range bits of the format of FIG. 4.

Referring to FIG. 4, four ranges of 10 bits × 32 bits each that follow the first range of 2 bits × 32 bits are recorded with the data of sound 1 through sound 4 respectively. Each range of 10 bits × 32 bits is arranged with 32 samples of sound data. That is, the number of bits per sample is 10. However, an analog audio signal is converted into a digital signal in which one sample consists of 14 bits. Of these bits, the upper 10 bits of significant digit are selected to be transmitted as one sample of data. That is, referring to FIG. 5, since the upper 10 bits of significant digit of the 14-bit data are selected, there are five selectable ranges. The range bit in the first range of 2 bits × 32 bits indicates one of these ranges of upper 10 bits.

In mode A, each of these ranges of 10 bits × 32 bits is arranged with one channel of sound data. In mode B, a range of 20 bits × 32 bits is arranged with one channel of sound data. Thus, mode B transmits sound data of higher quality than that transmitted in mode A.

The sound data 4 is followed by data of the independent data channel in a range of 15 bits × 32 bits. The last range consisting of 7 bits × 32 bits of the frame is arranged with a horizontal-direction error correction code (C1).

Figure 6:
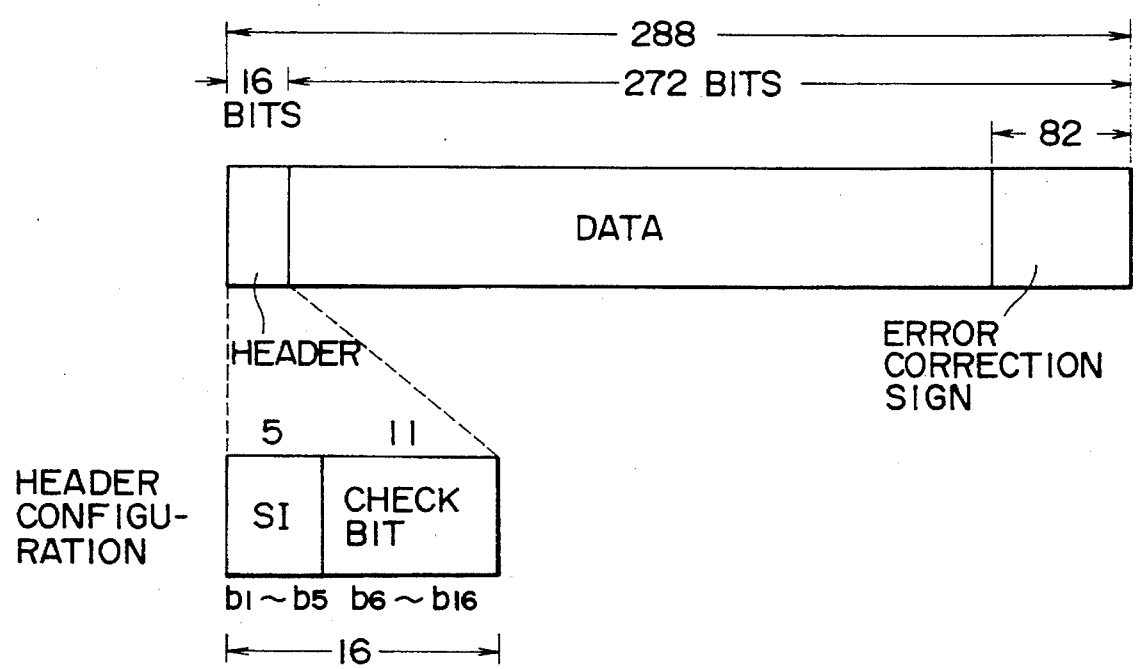
FIG. 6 is a diagram illustrating a format of a packet of an independent data channel.

The data of the independent data channel shown in FIG. 4 is transmitted on a packet basis. Referring to FIG. 6, there is shown a format of the packet. In the figure, one packet consists of 288 bits. The first 16 bits provide a header; the following 190 bits form substantial data; the following 82 bits form a packet error correction code (C1). Of the 16 header bits the first five bits provide service identification codes and the remaining 11 bits provide a horizontal-direction error correction code (check bits) (C1) for the service identification code. As will be described with reference to FIG. 11, the service identification codes include information for identifying the related information and the newspaper data.

Since five bits are provided for service identification, 32 services can be identified theoretically. However, as shown in FIG. 7, a code in which each of the five bits is "0" is used to indicate that the packet is transmitted as a dummy packet. Actually, the remaining 31 codes are used to identify 31 service types.

Referring to FIG. 8, nine frames of data, each frame shown in FIG. 4, are collected to form a super frame. A bit string of one packet is formed by data in one super frame.

As shown in FIG. 8, the data in the frames are transmitted sequentially vertically. Consequently, a burst error is caused in the vertical direction in FIG. 8. To make it hard for the burst error to occur, the independent data channel in the range of 15 bits × 32 bits is multiplexed obliquely. As shown in FIG. 8, since the independent data channel is 15 bits long horizontally, there are 15 oblique directions. The packet consisting of 288 bits shown in FIG. 6 is related to each of these directions. Therefore, the independent data channel has packets of 15 positions (packets of 15 channels). Thus, the oblique multiplexing allows data constituting each packet to be interleaved with data of another packet, thereby enhancing resistivity to burst error.

Referring to FIG. 9, there is shown a schematic diagram illustrating packets in the independent data channel. As shown in the figure, one of the 15 packets is assigned with the related information output from the encrypting circuit 11 of FIG. 2. The remaining 14 packets can be assigned with newspaper data (the newspaper data output from the data scrambler 14) of newspaper publishers A through I, for example. It should be noted that one newspaper publisher can use a plurality of packets at a time. In an embodiment of FIG. 9, one packet is used for transmitting the related information and two packets are used for transmitting newspaper data of each of newspaper publishers A, B, and C.

Referring to FIG. 10, there is shown a schematic diagram illustrating the contents of the packets of the 15 positions. In an embodiment of FIG. 10, packet 1 is assigned with related information and packets 2 through 15 are assigned with data of newspaper publishers A through I, respectively. That is, the related information and the newspaper data A through I are transmitted to each subscriber at one time.

Figures 11, 11A:
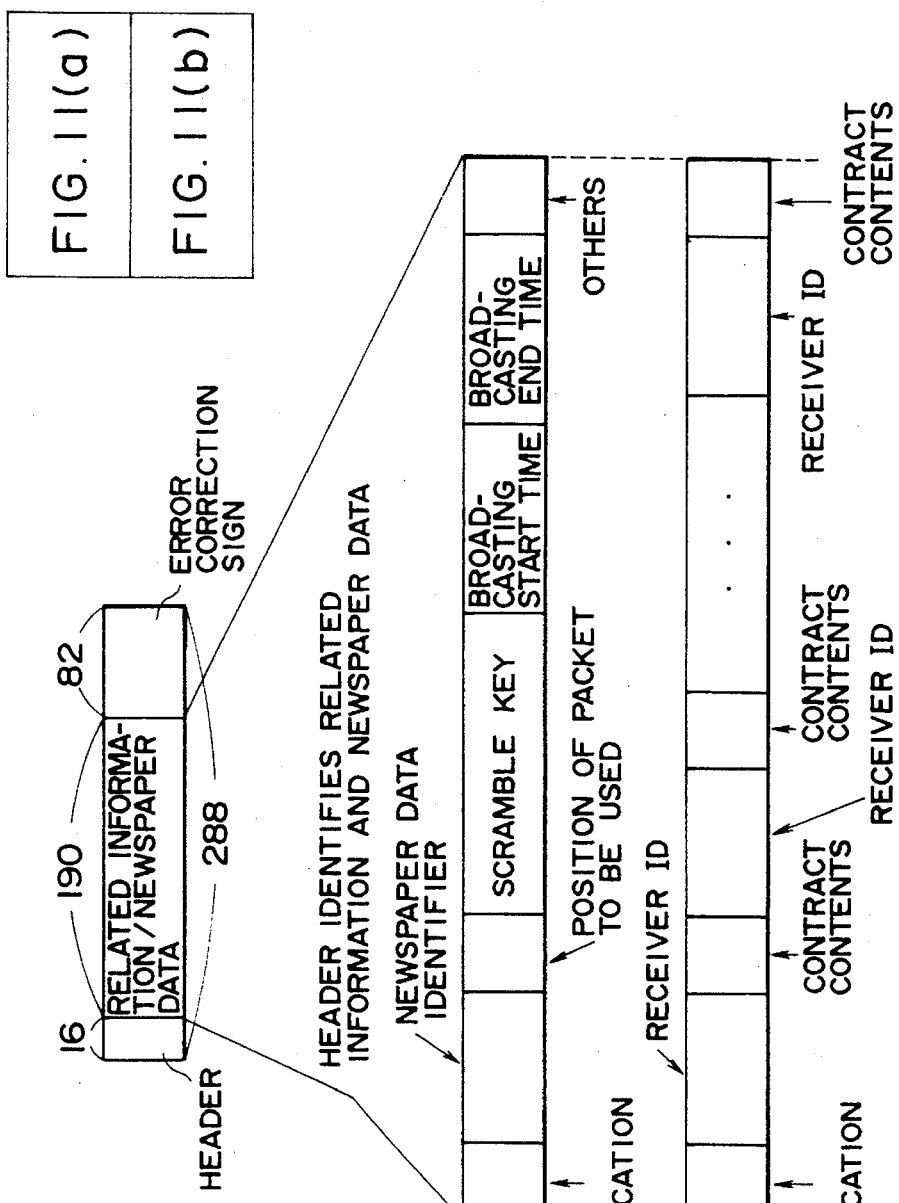
FIGS. 11(a) and (b) are diagrams illustrating a detailed format of a packet.

Referring to FIG. 11, there is shown a detailed format of a packet. As shown in the figure, the first 16 bits of the packet consisting of 288 bits provide a header, in which data (the service identification data of FIG. 6) for identifying the related data or newspaper data is located. The following 190 bits are used to contain the related information or newspaper data. The last 82 bits provide an error correction code.

The related information is divided into common information and individual information. The common information starts with a type identification code for identifying whether the information is common or individual. The type identification code is followed by a newspaper data identifier for identifying which of newspapers A, B, C and so on the data comes from. This identifier is followed by data indicating a position of a packet to be used. That is, following the newspaper data identifier, a code is disposed for indicating which of packets of positions 1 through 15 the data belongs to.

The packet position indicating code is followed by a scramble key. The scramble key is received by a data receiver 6 to be described. The received scramble key allows the data scrambled by the data scrambler of FIG. 2 to be descrambled.

The scramble key is followed by a broadcasting start time followed by a broadcasting end time. The broadcasting end time is followed by other necessary codes.

On the other hand, the individual information starts with a type identification code followed by a receiver ID. The receiver ID is assigned to the data receiver of FIG. 1, for example. The receiver ID is followed by subscription terms of the receiver. Then, another receiver ID and its subscription terms follow, followed by still another receiver ID and its subscription terms, and so on.

As shown in FIG. 10, since the related information assigned to the first packet is always transmitted, the receiving party can monitor the related information for the scramble key of a predetermined newspaper publisher and the broadcasting start and end times. If a data receiver having a receiver ID contained in individual information transmitted when the common information is not transmitted matches the subscription terms of the ID, the receiving party can download newspaper data of a corresponding newspaper publisher.

The newspaper data are divided into retrieval page data and article page data. The retrieval page data starts with a start code (the retrieval page a of FIG. 11). The start code indicates that the newspaper data of newspaper A, for example, starts here. The start code is followed by a newspaper data identifier. The newspaper data identifier identifies which of newspaper publishers A, B, C, and so on the data belongs to. The newspaper data identifier is followed by a type identification code for making a distinction between a retrieval page and an article page. The type identification code is followed by page identification data. The page identification data identifies a genre of articles such as a political page, an economic page, and a sports page, for example.

The page identification data is followed by a headline, a character size and font of the headline, and positional data of the headline, in this order. The positional data is followed by layout data for indicating whether the headline is oriented vertically or horizontally. The layout data is followed by a pointer for accessing a position in which an article under the headline is described.

The above-mentioned retrieval page "a" has the format of the first packet. In the second and subsequent packets, a format of retrieval page "b" may be used. That is, the format of the retrieval page "b" has no start code and newspaper data identifier.

On the other hand, the article page of the newspaper data starts with the type identification data, followed by a layout (the article page "a"). The layout is followed by an outline and article data showing detailed contents of the article. If the outline or the article data is too long to be contained in one packet, the packet shown by the article page "b" is added to the article page "a". The article data is terminated with an end code.

Figure 12B:
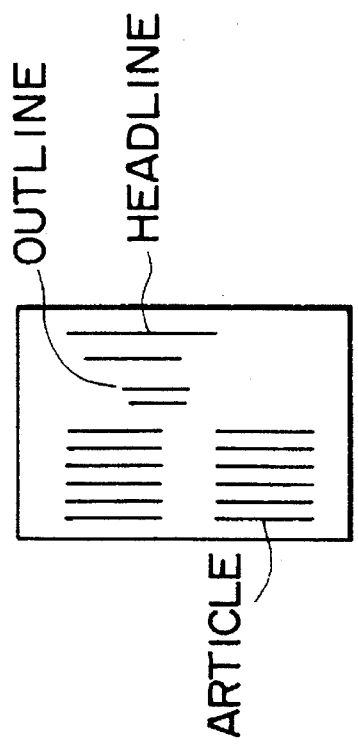
FIGS. 12(a) and (b) are schematic diagrams illustrating a retrieval page and an article page, respectively.
Figure 12A:
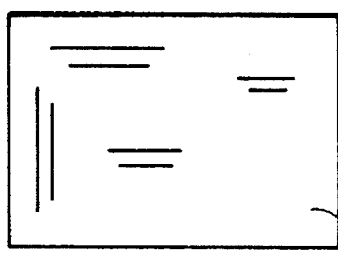

Referring to FIG. 12, there is shown a schematic diagram of a retrieval page and an article page. As shown in FIG. 12(a), the retrieval page shows only headlines. On the other hand, as shown in FIG. 12 (b), the article page shows not only a headline but also an article itself introduced by the headline and an outline of the article. A subscriber selects a desired headline by clicking it with a pointing device such as a mouse to display the corresponding outline and article as shown in FIG. 12(b).

Figure 13:
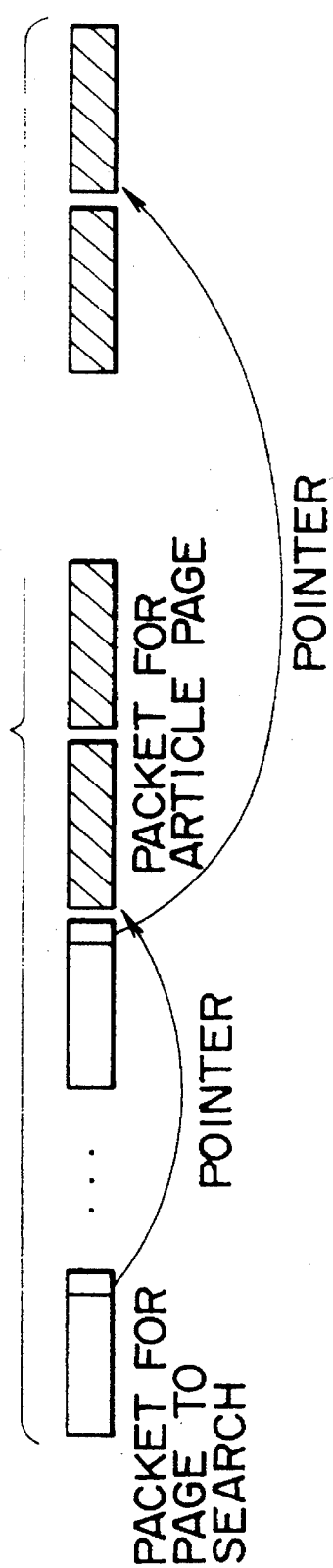
FIG. 13 is a diagram illustrating a relationship between a retrieval page and an article page.

Referring to FIG. 13, there is shown an overall layout packet of retrieval and article pages. As shown in the figure, the article page packets are preceded by the retrieval page packets. Each retrieval page packet has a pointer to a corresponding article page packet.

Referring to FIG. 1 again, the data arranged as mentioned above are transmitted from the broadcasting center to the satellite 4 to be delivered to each receiving party (subscriber). On the receiving party side, the data signal received by an outdoor apparatus 5 is converted to a predetermined intermediate-frequency (IF) signal. The IF signal is put in a data receiver 6. The data received by the data receiver 6 are demodulated there to be supplied to a recorder 7 to be recorded on a recording medium such as a compact magneto-optical disc 8 for example. The subscriber loads this disc 8 on a portable terminal 9, for example, to retrieve the retrieve page for a desired article page. Alternatively, the subscriber reads the data recorded in the recorder 7 to display the read data on a television receiver (TV) 10.

Referring to FIG. 14, there is shown a preferred embodiment of the data receiver 6. As shown, the IF signal entered via the outdoor apparatus 5 is supplied to a BS tuner 32. The subscriber presets a subscribed newspaper data broadcasting time on a timer circuit 34. The timer circuit 34 incorporates a clock and outputs a signal to a processor 35 composed of a CPU, a ROM, and a RAM, upon expiration of the preset time.

Upon receiving the signal from the timer circuit 34, the processor controls a power on/off controller 36 to turn on a power circuit 37. The power circuit 37, when turned on, supplies a power to each of the above-mentioned components to make the data receiver 6 ready to operate.

At that time, the processor 35 controls the BS tuner 32 via a BS tuner controller 31 to select a channel through which data of a subscribed newspaper publisher is transmitted. From the IF signal, the BS tuner 32 decodes a signal of the selected channel to send the decoded signal to a decoder 33. The decoder 33 decodes data in a packet containing subscribed newspaper data. The processor 35 supplies the data decoded by the decoder 33 to a recording medium 42 via a recording medium driver 41 in the recorder 7 to record the data onto the recording medium. The recording medium 42 is made up of a hard disk, for example. Alternatively, the processor 35 controls such that the output of the decoder 33 is recorded onto a recording medium made up of the compact magneto-optical disc 8, for example, via a recording medium driver 43.

Upon receiving a predetermined instruction, the processor 35 controls such that the data recorded on the recording medium 42 or the compact magneto-optical disc are reproduced to be supplied to a video circuit 38 in which the data are converted into a video signal. The video signal coming from the video circuit 38 is entered in the television receiver 10 to be displayed on its screen. Alternatively, as described with reference to FIG. 1, the compact magneto-optical disc recorded with the newspaper data is loaded on the portable terminal 9 to display the data on its screen.

In this case, since the newspaper data are composed of retrieval and article pages as described with reference to FIG. 12, the retrieval page (FIG. 12 (a)) can be displayed first to show headlines, according to which the subscriber selects an article page (FIG. 12 (b)) to read. Therefore, even if the screen of the portable terminal 9 or the television receiver 10 is too small to display a newspaper page in its entirety, it presents substantially no inconvenience in displaying only a selected article.

When the preset broadcasting end time expires, the timer circuit 34 outputs a signal to the processor 35. At this time, the processor 35 controls the power circuit 37 via the power on/off controller 36 to stop supplying the power, upon which the newspaper data download operation completed.

If the subscriber is receiving another channel during the time when subscribed newspaper data are broadcast, the processor 35 displays a message on the television receiver 10 via the video circuit 38 to prompt the subscriber for changing channels. Alternatively, the processor 35 generates an alarm sound for the same purpose. Further, it is possible for the processor 35 to forcibly and automatically change channels.

In the above-mentioned setup, the subscriber sets the time at which the data receiver 6 starts operating. A variation can be made to it so that, with the power on, broadcasting start and end times for individual newspaper data included in the related information are used to automatically preset a broadcasting time of subscribed newspaper data, thereby allowing the subscriber to automatically receive subscribed newspaper data without the subscriber's setting a time at which the data receiver 6 starts operating.

Figure 15B:
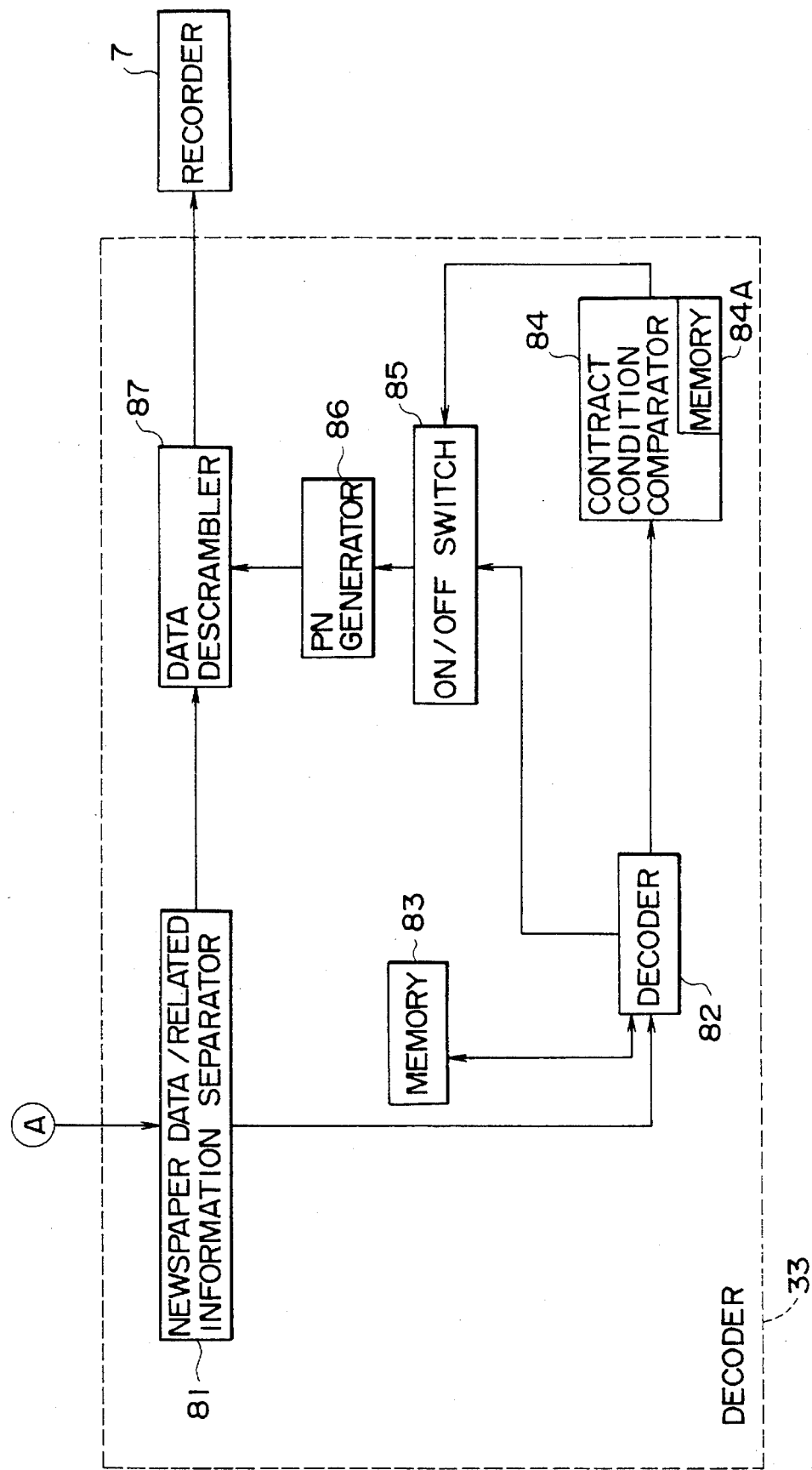
FIGS. 15(a) and (b) are block diagrams illustrating the detailed arrangement of a BS (Broadcasting Satellite) tuner and decoder of FIG. 14.

Referring to FIG. 15, there are shown the detailed construction of the BS tuner 32 and the decoder 33 by way of example. The IF signal captured via the outdoor apparatus 5 is entered in an FM demodulator 71 of the BS tuner 32. The FM demodulator 71 is supplied with a BS tuner control signal from the BS tuner controller 31. The FM demodulator 71 demodulates the IF signal of a channel corresponding to the BS tuner control signal into a base band signal, which is output to a video signal/digital channel signal separator 72. The video signal/digital channel signal separator 72 separates a video signal and a digital channel signal from the entered signal to output the video signal to the television receiver 10, for example, to display the signal on the screen thereof.

On the other hand, the digital channel signal separated by the video signal/digital channel signal separator 72 is entered in a 4-phase DPSK demodulator 73 to be demodulated. The demodulated signal is entered in a digital channel signal separator 74 to be separated into a audio signal and an independent data channel signal. The audio signal is sent to the television receiver 10 if the audio signal is one that corresponds to the above-mentioned video signal.

The digital channel signal separator 74 separates the independent data channel signal from the signal coming from the 4-phase DPSK demodulator 73 and sends the separated independent data channel signal to a newspaper data/related information separator 81 in the decoder 33. The newspaper data/related information separator 81 separates the newspaper data and the related information from the entered signal to send the separated newspaper data to a data descrambler 87 and the separated related information to a decoder 82. A memory 83 stores a receiver ID assigned to the decoder 33 (the data receiver 6).

When subscription terms of a receiver ID matching the receiver ID stored in the memory 83 comes as related information, the decoder 82 sends the subscription terms to a subscription terms comparator 84 to store the subscription terms in a built-in memory 84A. At the same time, the decoder 82 decodes the scramble key transmitted as related information (common information) to output the result to an on/off switch 85.

Then, upon decoding a data identifier from the entered related information, the decoder 82 supplies the decoded data identifier to the subscription terms comparator 84. The subscription terms comparator compares the entered data identifier with the subscription terms stored in the memory 84A. The subscription terms contain a data identifier of a subscribed newspaper. Unless the subscription terms contain a terms violation such as subscription fee in arrears, the subscription terms comparator 84 outputs a control signal for setting the on/off switch 85 to the on side when the data identifier stored in the memory 84A matches the data identifier supplied from the decoder 82. Thus, the scramble key coming from the decoder 82 is supplied to a PN generator 86 via the on/off switch 85.

The PN generator 86 generates a pseudo random series according to the entered scramble key. Using the pseudo random series coming from the PN generator 86, the data descrambler 87 descrambles the newspaper data supplied from the newspaper data/related information separator 81. The descrambled newspaper data are supplied to the recorder 7 to be recorded onto the compact magneto-optical disc 8 or the recording medium 84 such as a hard disk.

It will be apparent that the present invention is also applicable to the transmission of character data other than newspaper data such as magazines and books. Further, the present invention is applicable to the transmission of image data and sound data at one time.

As described and according to the invention, there is provided a data broadcasting system in which data coming via a satellite is received by a data receiver to be recorded on a recording medium, thus making it unnecessary for a subscriber to access the data sending party, resulting in the simplified, low-cost delivery of data such as newspapers, magazines, and books.

While the preferred embodiments of the present invention have been described using specific terms, such description is for illustrative purposes only, and it is to be understood that changes and variations may be made without departing from the spirit or scope of the appended claims.

What is claimed is:

1. A data broadcasting method for transmitting predetermined data via a broadcasting channel, comprising the steps of:

scrambling retrieval page and article page data including one of a newspaper, a magazine, and a book using a scramble key to obtain scrambled data;

encrypting data related to the scramble key, common information, a receiver ID, and subscription terms to obtain encrypted related data;

inserting the scrambled data and the encrypted related data into a predetermined artificial satellite channel;

transmitting the predetermined channel including the scrambled data and encrypted related data via an artificial satellite;

receiving the transmitted scrambled data and encrypted related data from said artificial satellite;

decrypting the received encrypted related data to obtain decrypted related data; and unscrambling the received scrambled data using the received scrambler key to obtain unscrambled data to reproduce said newspaper, magazine, and book.

2. A data broadcasting method according to claim 1, further comprising the step of:

recording the unscrambled data onto a recording medium.

3. A data broadcasting method according to claim 1, wherein said artificial satellite channel is a digital data transmitting channel of one of a broadcasting satellite and a communications satellite.

4. A data broadcasting method according to claim 1, wherein said data include article data and retrieval data for retrieving said article data.

5. A data broadcasting method according to claim 4, wherein said article data and said retrieval data are scrambled.

6. A data broadcasting system for transmitting predetermined data via a broadcasting channel, comprising:

scrambling means to scramble retrieval page and article page data including one of a newspaper, a magazine, and a book using a scramble key to obtain scrambled data;

encrypting means for encrypting data related to the scramble key, common information, a receiver ID, and subscription terms to obtain encrypted related data;

multiplexing means for multiplexing the scrambled data and the encrypted related data with a broadcast signal to generate a multiplexed signal;

transmitting means for transmitting said multiplexed signal to a predetermined artificial satellite channel;

receiving means for receiving said multiplexed signal via said predetermined artificial satellite channel;

separating means for separating said data from said multiplexed signal received by said receiving means;

decrypting means for decrypting the received encrypted related data to obtain decrypted related data; and unscrambling means for unscrambling the received scrambled data by using the received scrambler key to obtain unscrambled data to reproduce said newspaper, magazine, and book.

7. A data broadcasting system according to claim 6, further comprising:

recording means for recording the unscrambled data onto a recording medium.

8. A data broadcasting system according to claim 6, wherein said artificial satellite channel is a digital data transmitting channel of one of broadcasting satellite and a communications satellite.

9. A data broadcasting system according to claim 6, wherein said data include article data and retrieval data for retrieving said article data.

10. A data broadcasting system according to claim 9, wherein said article data and said retrieval data are scrambled.

11. A data broadcasting system for transmitting predetermined data via a broadcasting channel, comprising:

scrambling means for scrambling retrieval page and article page data including one of a newspaper, a magazine, and a book using a scramble key to obtain scrambled data;

encrypting means for encrypting data related to the scramble key, common information, a receiver ID, and subscription terms to obtain encrypted related data;

multiplexing means for multiplexing an audio signal and a video signal with the scrambled data and the encrypted related data to generate a multiplexed signal;

transmitting means for transmitting said multiplexed signal to a predetermined artificial satellite channel;

receiving means for receiving said multiplexed signal via said predetermined artificial satellite channel;

separating means for separating said data from said multiplexed signal received by said receiving means; and decrypting means for decrypting the received encrypted related data to obtain decrypted related data; and unscrambling means for unscrambling the received scrambled data by using the received scrambler key to obtain unscrambled data to reproduce said newspaper, magazine, and book.

12. A data broadcasting apparatus according to claim 11, wherein said data include article data and retrieval data for retrieving said article data, said retrieval data including a pointer for indicating said article data.

13. A data broadcasting apparatus according to claim 11, wherein said scrambling key for scrambling said data is predetermined and said multiplexing means multiplexes said predetermined scramble key with said multiplexed signal.

14. A data broadcasting apparatus according to claim 11, wherein said multiplexing means multiplexes subscription terms information with said data.

* * * * *